US008822360B2

(12) United States Patent
Schmidt et al.

(10) Patent No.: US 8,822,360 B2
(45) Date of Patent: Sep. 2, 2014

(54) ARTICLE INCLUDING CERAMIC STRUCTURE

(75) Inventors: Wayde R. Schmidt, Pomfret Center, CT (US); Paul Sheedy, Vernon, CT (US); Tania Bhatia Kashyap, Middletown, CT (US); Daniel G. Goberman, East Granby, CT (US); Xia Tang, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 147 days.

(21) Appl. No.: 13/352,636

(22) Filed: Jan. 18, 2012

(65) Prior Publication Data

US 2013/0183531 A1 Jul. 18, 2013

(51) Int. Cl.
*C04B 35/14* (2006.01)

(52) U.S. Cl.
USPC ............. 501/87; 501/103; 501/108; 501/123; 501/126; 501/152; 501/154; 428/428; 428/698

(58) Field of Classification Search
CPC C04B 35/56; C04B 35/5603; C04B 35/5607; C04B 35/5611; C04B 35/5615; C04B 35/565
USPC ........... 501/87, 103, 108, 123, 126, 152, 154; 428/428, 698
See application file for complete search history.

(56) References Cited

U.S. PATENT DOCUMENTS

| 5,284,806 | A | 2/1994 | Gadkaree |
| 5,707,471 | A | 1/1998 | Petrak et al. |
| 5,958,324 | A | 9/1999 | Bujalski et al. |
| 6,022,621 | A | 2/2000 | McCarron, III et al. |
| 6,254,975 | B1 | 7/2001 | Kayser et al. |
| 6,294,125 | B1 | 9/2001 | Bridgewater et al. |
| 6,331,362 | B1 | 12/2001 | Dupel et al. |
| 7,749,425 | B2 | 7/2010 | Malenfant et al. |

FOREIGN PATENT DOCUMENTS

| CA | 2475212 | 1/2006 |
| EP | 1298104 | 4/2003 |

OTHER PUBLICATIONS

Greil "Active-Filler-Controlled Pyrolysis of Preceramic Polymers" J.Am.Ceram. Soc., 78(4) 1995, p. 835-848.*
Renlund et al "Silicon oxycarbide glasses:Part I. Preparation and chemistry" J.Mater.Res., vol. 6, No. 12, 1991 p. 2716-2722.*
Tyczkowski et al "Ultraviolet luminescence of Gd-doped a-SixCyOz:H films fabricated by plasma chemical vapor depostion" Mat. Sc, and Eng. B 146 2008 p. 151-156.*
Walter et al "Injection Moulding of Polysiloxane/Filler Mixtures for Oxycarbide Ceramic Composites" Jour. of the Eur. Ceram. Soc, 16 1996 p. 387-393.*
Harshe, R., Balan, C., & Riedel, R. (2004). Amorphous Si(Al)OC ceramic from polysiloxanes: bulk ceramic processing, crystallization behavior and applications. Journal of the European Ceramic Society 24(2004) 3471-3482.
Extended European Search Report for European Patent Application No. 13151516.5-1354 completed Mar. 20, 2013.

* cited by examiner

*Primary Examiner* — Archene Turner
(74) *Attorney, Agent, or Firm* — Carlson, Gaskey & Olds, P.C.

(57) ABSTRACT

An article which includes a structure of a ceramic material that has a composition $SiO_xM_zC_y$, where Si is silicon, O is oxygen, M is at least one metal and C is carbon and wherein x<2, y>0 and z<1 and x and z are non-zero.

16 Claims, 3 Drawing Sheets

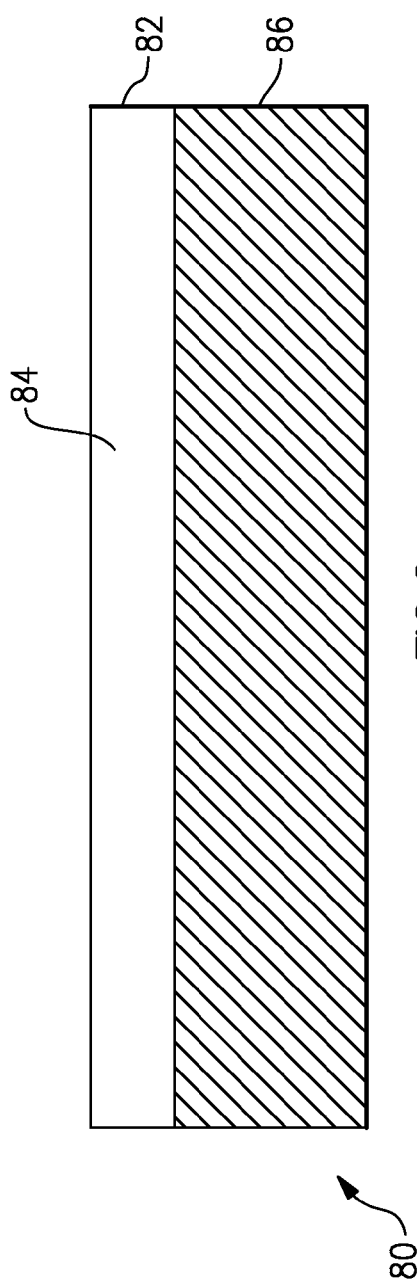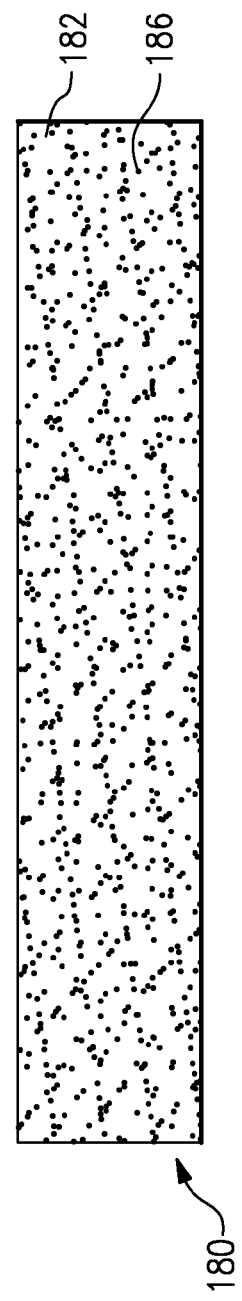

ARTICLE INCLUDING CERAMIC STRUCTURE

STATEMENT REGARDING FEDERALLY SPONSORED RESEARCH OR DEVELOPMENT

This invention was made with government support under contract number N00014-10-C-0195 awarded by the United States Navy. The government has certain rights in the invention.

BACKGROUND

This disclosure relates to articles that include ceramic structures for environmental protection in machines.

Machine components, such as components of gas turbine engines, are subjected to high temperatures, corrosive and oxidative conditions and elevated stress levels. In order to improve the thermal and oxidative stability of such components, the components may include a thermally resistant ceramic material as an environmental barrier, thermal barrier or velocity barrier coating or a coating that is selectively abradable or resistant to erosion.

SUMMARY

Disclosed is an article that comprises a structure of a ceramic material that has a composition $SiO_xM_zC_y$, where Si is silicon, O is oxygen, M is at least one metal and C is carbon and wherein x<2, y>0 and z<1 and x and z are non-zero.

In a further embodiment of the foregoing article, the composition includes 0.5-20 at % of the at least one metal.

In a further embodiment of the foregoing article, the composition includes 1-10 at % of the at least one metal.

In a further embodiment of the foregoing article, the at least one metal is selected from a group consisting of aluminum, boron, transition metals, refractory metals, rare earth metals, alkaline earth metals and combinations thereof.

In a further embodiment of the foregoing article, the at least one metal is selected from a group consisting of aluminum, boron and combinations thereof.

In a further embodiment of the foregoing article, the at least one metal is a transition metal selected from a group consisting of titanium, zirconium, hafnium, vanadium, chromium and combinations thereof.

In a further embodiment of the foregoing article, the at least one metal is a refractory metal selected from a group consisting of niobium, tantalum, molybdenum, tungsten, rhenium and combinations thereof.

In a further embodiment of the foregoing article, the at least one metal is a rare earth metal selected from scandium, ytterbium, gadolinium, yttrium, lanthanum, neodymium, dysprosium, lutetium, and combinations thereof.

In a further embodiment of the foregoing article, the at least one metal is an alkaline earth metal selected from magnesium, calcium, strontium, barium, and combinations thereof.

In a further embodiment of the foregoing article, the structure is a substantially uniform thickness layer on a substrate selected from the group consisting of a superalloy material, a ceramic material, a glass or glass-ceramic, carbon or combinations thereof.

In a further embodiment of the foregoing article, the structure is a matrix in which a reinforcement phase is dispersed, the reinforcement phase is selected from the group consisting of a superalloy material, a ceramic material, a glass or glass-ceramic, carbon or combinations thereof.

In a further embodiment of the foregoing article, the structure consists of the ceramic material, and the ceramic material consists of the composition $SiO_xM_zC_y$.

In another aspect, the article is included within a machine. In one non-limiting example, the machine is a gas turbine engine.

In a further embodiment of the foregoing machine, the at least one metal is selected from a group consisting of aluminum, boron, transition metals, refractory metals, rare earth metals, alkaline earth metals and combinations thereof.

In a further embodiment of the foregoing machine, the at least one metal is selected from a group consisting of aluminum, boron and combinations thereof.

A further embodiment of the foregoing machine includes a compressor section, a combustor in fluid communication with the compressor section and a turbine section in fluid communication with the combustor, and the article is within the compressor section, the combustor or the turbine section.

A further embodiment of the foregoing machine includes an augmentor section, and the ceramic article is within the augmentor section.

Also disclosed is a method of manufacturing an article. The method comprises forming a ceramic structure that includes a material having a composition $SiO_xM_zC_y$, where Si is silicon, O is oxygen, M is at least one metal and C is carbon and wherein x<2, y>0 and z<1 and x and z are non-zero.

In a further embodiment of the foregoing method, the forming includes pyrolysis of a preceramic polymer material.

In a further embodiment of the foregoing method, the forming includes pyrolysis of a preceramic polymer material that has the metal covalently bonded in a polymer structure.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 2 illustrates an example article.

FIG. 3 illustrates another example article.

DETAILED DESCRIPTION OF THE PREFERRED EMBODIMENT

Figure 1A:
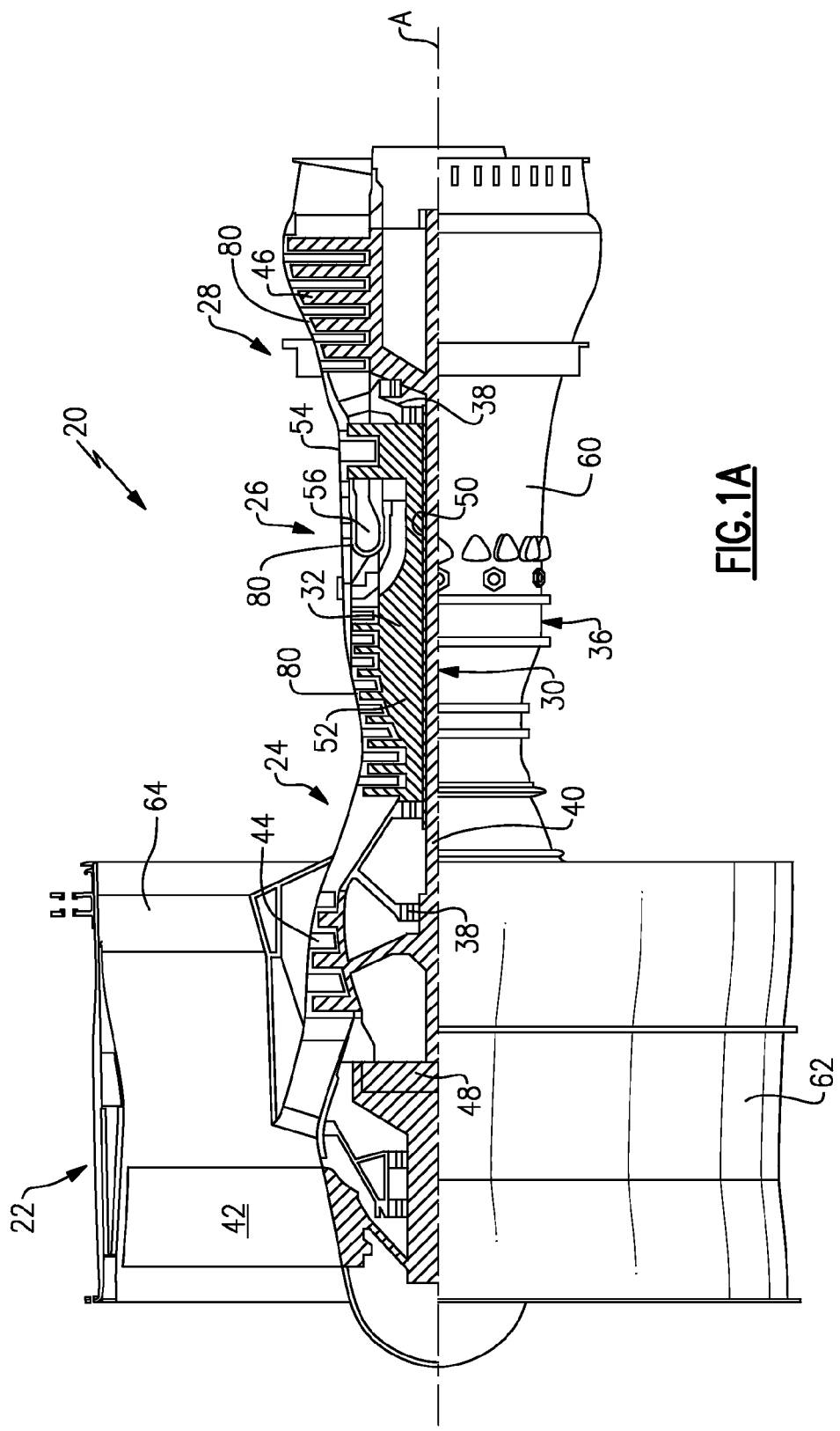
FIG. 1A illustrates an example gas turbine engine.

FIG. 1A illustrates selected portions of an example gas turbine engine 20, which serves as one exemplary machine according to this disclosure. It is to be understood that the machine is not limited to the example gas turbine engine 20 and may alternatively be a rocket, ground-based gas turbine or other machine that would benefit from this disclosure. As will be described in further detail, the machine includes a ceramic article that has a thermally resistant ceramic material. The article may be a combustion chamber, a turbine vane, compressor blade or vane, blade outer air seal, augmentor component or other component that would benefit from this disclosure but is not limited to articles for gas turbine engines.

Figure 1B:
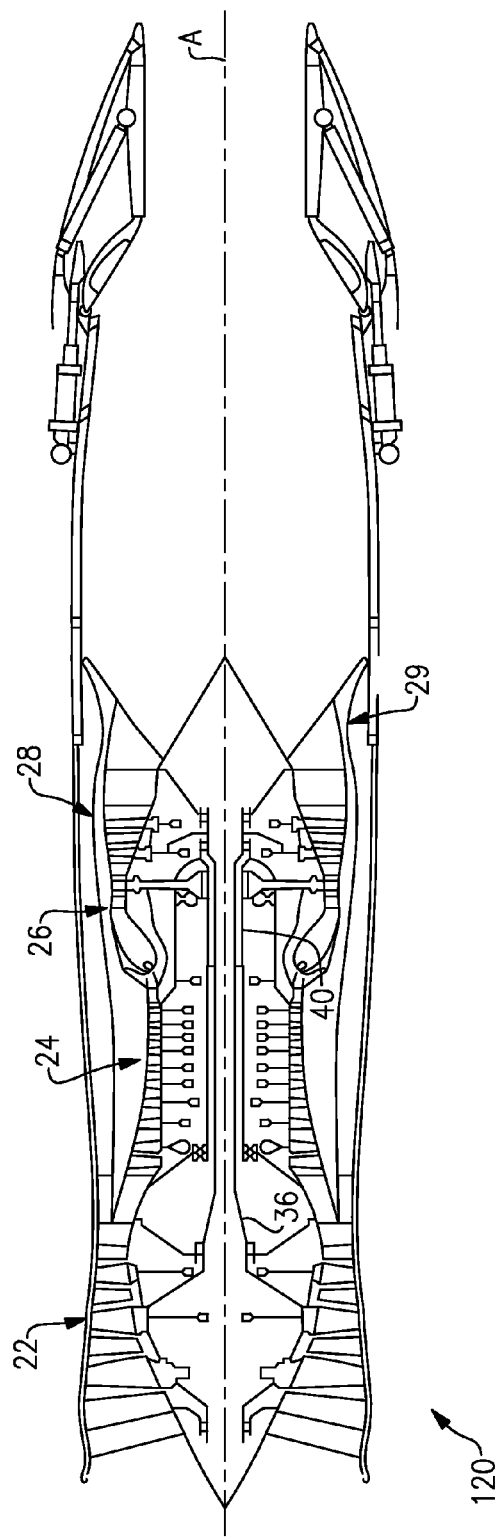
FIG. 1B illustrates another example gas turbine engine that has an augmentor.

The illustrated gas turbine engine 20 is a two-spool turbofan that generally incorporates a fan section 22, a compressor section 24, a combustor section 26 and a turbine section 28. It should be understood that the concepts described herein are not limited to use with turbofans as the teachings may be applied to other types of turbine engines, such as three-spool architectures. Alternative engines might also include other systems or features, or, may not include the fan section 22 such as that for industrial gas turbine engines. In a further example shown in FIG. 1B, the engine is an augmented low bypass gas turbine engine 120 that includes augmentor section 29.

The engine 20 (FIG. 1A) generally includes a low spool 30 and a high spool 32 mounted for rotation about an engine central longitudinal axis A relative to an engine static structure 36 via several bearing systems 38. It should be understood that various bearing systems 38 at various locations may alternatively or additionally be provided.

The low spool 30 generally includes an inner shaft 40 that interconnects a fan 42, a low pressure compressor 44 and a low pressure turbine 46. The inner shaft 40 may be connected to the fan 42 directly or through a geared architecture 48 (a geared turbofan engine enabling a high flow bypass ratio) to drive the fan 42 at a lower speed than the low spool 30, which in one disclosed non-limiting embodiment includes a gear reduction ratio of about 2.3:1 or greater. Although the geared architecture 48 is located near the front of the engine 20 in the example, its location is not limited and it may alternatively be located farther aft or at the rear of the engine 20.

The high spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A that is collinear with their longitudinal axes.

The engine static structure 36 is generally defined by a core case 60 and a fan case 62. The fan case 62 is at least partially supported relative to the core case 60 by a plurality of fan exit guide vanes 64. The core case 60 is often referred to as the engine backbone and supports the rotational componentry therein.

The fan section 22 drives air through a bypass flowpath while the compressor section 24 drives air along a core flowpath for compression and communication into the combustor section 26 then expansion through the turbine section 28. The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low spool 30 and high spool 32 in response to the expansion.

In one embodiment, the engine 20 bypass ratio is about 6 or greater or about 10 or greater, the geared architecture 48 is an epicyclic gear train, such as a planetary gear system or other gear system, with a gear reduction ratio of about 2.3 or greater or about 2.5 or greater and the low pressure turbine 46 has a pressure ratio that is about 5 or greater.

FIG. 2 illustrates a portion of an article 80 that is used in a machine, such as the gas turbine engine 20 described above. The article 80 may be a combustion chamber, a turbine vane, compressor blade or vane, blade outer air seal, augmentor component, other component within the gas turbine engine 20 or a portion thereof, for example. As shown, the article 80 includes a structure 82 made of a ceramic material 84 of composition $SiO_xM_zC_y$, where Si is silicon, O is oxygen, M is at least one metal and C is carbon and wherein x<2, y>0 and z<1 and x and z are non-zero. In a further example, the structure 82 includes only the ceramic material to the exclusion of any other materials or phases, and the ceramic material includes only the elements of the composition $SiO_xM_zC_y$ to the exclusion of other elements with the exception of trace impurity elements.

In a further example, the composition includes a predetermined atomic percentage (at %) of a metal or metals. In one embodiment, the predetermined amount of the metal or metals is 0.5-20 at %. In a further example, the amount of metal or metals is 1-10 at %. Thus, the metal or metals are present in the composition in a relatively low amount and are primarily used as a dopant in order to preserve the primary properties of the composition.

In embodiments, the metal or metals of the composition are selected from aluminum, boron, transition metals, refractory metals, rare earth metals, alkaline earth metals and combinations thereof. The selected metal or metals preserve the glass-forming capability of the $SiO_xM_zC_y$ composition. In this sense, and herein, a glass is defined as an amorphous, generally non-crystalline, oxygen-containing solid with minimal long range structural order. The metal-containing glass of this example may also readily and further oxidize upon exposure to environmental oxidizing conditions, such as the environmental operating conditions within the gas turbine engine 20, further forming a glassy or crystalline oxide product. Thus, it is to be understood that the composition can change upon oxidation.

In a further example, the metal or metals are transition metals selected from titanium, zirconium, hafnium, vanadium, chromium and combinations thereof.

In another embodiment, the metal or metals are refractory metals selected from niobium, tantalum, molybdenum, tungsten, rhenium, and combinations thereof.

In another embodiment, the metal or metals are rare earth metals selected from scandium, ytterbium, gadolinium, yttrium, lanthanum, neodymium, dysprosium, lutetium, and combinations thereof.

In another embodiment, the metal or metals are the alkaline earth metals selected from barium, calcium, magnesium, and strontium, and combinations thereof. It is to be understood that the composition can also include any combination of any of the above disclosed metals.

The metal or metals within the composition form one or more thermally stable glasses in the structure 82. For example, the microstructure of the structure 82 includes one or more regions of glass that include the metal or metals. The metal-containing glass regions may be dispersed in the structure within regions of Si—O—C ceramic material or comprise the entirety of the structure.

The presence of the metal or metals within the composition also serves to getter oxygen in-situ and thus intercepts oxygen that might otherwise react with the composition to form unfavorable or undesired phases within the structure 82, subsequently improving the properties, durability and densification of the article 80 in oxidizing environments. In examples based upon boron or aluminum, the composition forms a borosilicate or aluminosilicate glass, respectively in oxidizing environments, or both if boron and aluminum are used. The in-situ formed glass oxidation product or products can have a local melting temperature in the structure 82 that is lower than the surrounding Si—O-M-C regions. The low melting point glass regions thereby soften or melt upon exposure to elevated temperatures and are thus able to move into microcracks to seal those areas. In one example, the oxygen source is the atmosphere in which the engine is operated.

As shown in FIG. 2, the structure 82 is disposed on a substrate 86. In this example, the structure 82 is a substantially uniform thickness layer that serves to protect the underlying substrate 86. As will be described in further detail below, the substrate 86 can be made of a metallic material, ceramic material or combination thereof, and is provided in the desired shape of the component. Optionally, one or more topcoat layers can be applied onto the structure 82 for the further protection of the underlying substrate 86. An additional option is the use of a metallic bond layer between the structure 82 and the substrate 86.

FIG. 3 illustrates another example ceramic article 180, where reference numerals with the addition of one hundred designate modified elements that are understood to incorporate the same features and benefits of the corresponding elements. In this example, the ceramic article 180 includes a structure 182 that is similar to the structure 82 described above and includes the ceramic material 84. The structure 182 as shown is self-supporting, but alternatively may be provided on a substrate. In this example, the structure 182 serves as a matrix and includes a reinforcement phase 186 that is dispersed within the structure 182. In one embodiment, the structure 182 serves as a continuous matrix material through which the continuous or discontinuous reinforcement phase 186 is dispersed. In a further example, the reinforcement phase 186 includes continuous or discontinuous fibers.

In the disclosed examples, the substrate 86 and the reinforcement phase 186 are not limited to any particular materials. However, given the ability of the composition of the structures 82 and 182 to getter oxygen and seal microcracking, the materials of the substrate 86 and reinforcement phase 186 may be those that would benefit from the protection afforded by the structures 82 and 182. In a few examples, the substrate 86 and reinforcement phase 186 are or include a superalloy material, a ceramic material, a glass or glass-ceramic, carbon or combinations thereof. The superalloy material may be nickel-based, cobalt-based or nickel-iron-based. The ceramic material may include carbides, oxides, nitrides, borides, silicides, oxycarbides, oxynitrides, carbonitrides, aluminides, silicates, titanates, phosphates, phosphides or combinations thereof. The glass and glass-ceramic materials may include silica, borosilicates, barium aluminosilicates, lanthanum aluminosilicates, strontium magnesium silicates, barium magnesium aluminosilicates, calcium magnesium aluminosilicates and lithium-containing glasses.

The structures 82 and 182 of articles 80 and 180 are made by forming the articles to include the material having the disclosed composition. For instance, the forming of the structure 82 or 182 includes pyrolysis of a preceramic polymer material at a temperature of approximately 400° C.-1700° C. in a generally inert (e.g., argon) or oxidizing atmosphere. The preceramic polymer material includes a carbosilane-based or carbosiloxane polymer and the desired metal or metals to form the disclosed composition. In other examples, the polymer is silazane-based, silane-based, siloxane-based or a blend of these. In a further example, the metal is covalently bonded as a heteroatom within the polymer structure such that upon pyrolysis, the given composition is formed.

Alternatively, or in addition to the covalent bonding of the metal or metals within the polymer structure, the metal or metals are mixed with the polymer as a metal-containing additive. In embodiments, the metal-containing additive is an oxide of the metal or metals, an organometallic compound of the metal or metals, a metal-organic compound, free metal or combination thereof, which is mixed with the polymer. Thus, the metal or metals are not initially covalently bonded to the polymer structure itself but instead are simply physically mixed as a solid or liquid additive with the polymer. Upon pyrolysis, the metal chemically incorporates into the ceramic char to form the given composition. Alternatively, a post-pyrolysis heat treatment can be used to chemically incorporate the metal or metals and/or diffuse the metal or metals in gaseous or other initial form, or resulting glass, into the ceramic char.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An article comprising:
a structure including a ceramic material having a composition $SiO_xM_zC_y$, where Si is silicon, O is oxygen, M is at least one metal and C is carbon and wherein x<2, y>0 and z<1 and x and z are non-zero, wherein the composition includes 1-20 at % of the at least one metal, and the at least one metal is selected from the group consisting of titanium, zirconium, hafnium, vanadium, chromium, niobium, tantalum, molybdenum, tungsten, rhenium, scandium, ytterbium, yttrium, lanthanum, neodymium, dysprosium, lutetium, magnesium, calcium, strontium, barium, and combinations thereof.

2. The article as recited in claim 1, wherein the at least one metal is metal selected from a group consisting of titanium, zirconium, hafnium, vanadium, chromium and combinations thereof.

3. The article as recited in claim 1, wherein the at least one metal is metal selected from a group consisting of niobium, tantalum, molybdenum, tungsten, rhenium and combinations thereof.

4. The article as recited in claim 1, wherein the at least one metal is metal selected from scandium, ytterbium, yttrium, lanthanum, neodymium, dysprosium, lutetium, and combinations thereof.

5. The article as recited in claim 1, wherein the at least one metal is metal selected from magnesium, calcium, strontium, barium, and combinations thereof.

6. The article as recited in claim 1, wherein the structure is a substantially uniform thickness layer on a substrate selected from the group consisting of a superalloy material, a ceramic material, a glass or glass-ceramic, carbon or combinations thereof.

7. The article as recited in claim 1, wherein the structure is a matrix in which a reinforcement phase is dispersed, the reinforcement phase is selected from the group consisting of a superalloy material, a ceramic material, a glass or glass-ceramic, carbon or combinations thereof.

8. The article as recited in claim 1, wherein the structure consists of the ceramic material, and the ceramic material consists of the composition $SiO_xM_zC_y$.

9. The article as recited in claim 1, wherein the at least one metal includes hafnium.

10. The article as recited in claim 1, wherein the at least one metal includes zirconium.

11. The article as recited in claim 1, wherein the at least one metal is selected from the group consisting of ytterbium, yttrium, lanthanum, neodymium, dysprosium, lutetium, and combinations thereof.

12. The article as recited in claim 1, wherein the at least one metal is selected form the group consisting of strontium, barium, and combinations thereof.

13. An article comprising:
a structure including a ceramic material having a composition $SiO_xM_zC_y$, where Si is silicon, O is oxygen, M is at least one metal and C is carbon and wherein $x<2$, $y>0$ and $z<1$ and x and z are non-zero, wherein the at least one metal is selected from the group consisting of hafnium, niobium, tantalum, molybdenum, tungsten, rhenium and combinations thereof.

14. A machine comprising:
an article including a ceramic material having a composition $SiO_xM_zC_y$, where Si is silicon, O is oxygen, M is at least one metal and C is carbon and wherein $x<2$, $y>0$ and $z<1$ and x and z are non-zero, wherein the composition includes 1-20 at % of the at least one metal, and the at least one metal is selected from the group consisting of titanium, zirconium, hafnium, vanadium, chromium, scandium, ytterbium, yttrium, lanthanum, neodymium, dysprosium, lutetium, magnesium, calcium, strontium, barium, and combinations thereof.

15. The machine as recited in claim 14, including a compressor section, a combustor in fluid communication with the compressor section and a turbine section in fluid communication with the combustor, and wherein the article is within the compressor section, the combustor or the turbine section.

16. The machine as recited in claim 14, including an augmentor section, wherein the article is within the augmentor section.

* * * * *